United States Patent
Ohkubo et al.

(10) Patent No.: US 11,795,359 B2
(45) Date of Patent: Oct. 24, 2023

(54) COMPOSITION CONTAINING REFRIGERANT, REFRIGERATION METHOD USING SAID COMPOSITION, METHOD FOR OPERATING REFRIGERATION DEVICE, AND REFRIGERATION DEVICE

(71) Applicant: DAIKIN INDUSTRIES, LTD., Osaka (JP)

(72) Inventors: Shun Ohkubo, Osaka (JP); Mitsushi Itano, Osaka (JP); Yuuki Yotsumoto, Osaka (JP); Akihito Mizuno, Osaka (JP); Tomoyuki Gotou, Osaka (JP); Yasufu Yamada, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 233 days.

(21) Appl. No.: 17/374,253

(22) Filed: Jul. 13, 2021

(65) Prior Publication Data

US 2021/0340422 A1 Nov. 4, 2021

Related U.S. Application Data

(63) Continuation of application No. PCT/JP2019/047097, filed on Dec. 2, 2019.

(30) Foreign Application Priority Data

Jan. 30, 2019 (JP) .................. 2019-013974

(51) Int. Cl.
C09K 5/04 (2006.01)
C10M 107/24 (2006.01)
C10M 107/34 (2006.01)
C10N 40/30 (2006.01)

(52) U.S. Cl.
CPC ........... *C09K 5/045* (2013.01); *C10M 107/24* (2013.01); *C10M 107/34* (2013.01); C09K 2205/122 (2013.01); C09K 2205/126 (2013.01); C09K 2205/22 (2013.01); *C10M 2209/043* (2013.01); *C10M 2209/1023* (2013.01); *C10M 2209/1033* (2013.01); *C10N 2040/30* (2013.01)

(58) Field of Classification Search
CPC .............. C09K 5/045; C09K 2205/122; C09K 2205/126; C09K 2205/22; C09K 2205/40; C09K 5/04; C10M 107/24; C10M 107/34; C10M 2209/043; C10M 2209/1023; C10M 2209/1033; C10N 2040/30; F25B 1/00
USPC .......... 252/67, 68, 69; 62/467, 529
See application file for complete search history.

(56) References Cited

U.S. PATENT DOCUMENTS

| | | | |
|---|---|---|---|
| 2,309,224 A | 1/1943 | Terry et al. | |
| 6,658,882 B2 | 12/2003 | Ohama et al. | |
| 8,168,077 B2 | 5/2012 | Spatz | |
| 8,961,811 B2 | 2/2015 | Minor et al. | |
| 10,131,827 B2 * | 11/2018 | Fukushima | ............ C09K 5/045 |
| 11,365,335 B2 | 6/2022 | Itano et al. | |
| 11,441,819 B2 | 9/2022 | Itano et al. | |
| 11,447,613 B2 | 9/2022 | Fabian et al. | |
| 11,549,041 B2 * | 1/2023 | Itano | ...................... C09K 5/045 |
| 2010/0122545 A1 | 5/2010 | Minor et al. | |
| 2011/0252801 A1 | 10/2011 | Minor et al. | |
| 2011/0253927 A1 | 10/2011 | Minor et al. | |
| 2011/0258146 A1 | 10/2011 | Low | |
| 2013/0193368 A1 | 1/2013 | Low | |
| 2015/0027156 A1 | 1/2015 | Bellamy, Jr. | |

(Continued)

FOREIGN PATENT DOCUMENTS

| | | |
|---|---|---|
| CA | 3 015 523 | 9/2017 |
| CN | 102245731 | 11/2011 |

(Continued)

OTHER PUBLICATIONS

International Preliminary Report on Patentability dated Jan. 19, 2021 in International (PCT) Application No. PCT/JP2019/027989.
International Search Report dated Sep. 10, 2019 in International (PCT) Application No. PCT/JP2019/027989.
International Preliminary Report on Patentability dated Jan. 19, 2021 in International (PCT) Application No. PCT/JP2019/027988.
International Search Report dated Sep. 10, 2019 in International (PCT) Application No. PCT/JP2019/027988.

(Continued)

*Primary Examiner* — Douglas J McGinty
(74) *Attorney, Agent, or Firm* — WENDEROTH, LIND & PONACK, L.L.P.

(57) ABSTRACT

The present disclosure provides a composition comprising a refrigerant that has characteristics of having a coefficient of performance (COP) and a refrigerating capacity equivalent to or higher than those of R404A, and having a sufficiently low GWP. More specifically, the present disclosure provides a composition comprising a refrigerant, the refrigerant comprising trans-1,2-difluoroethylene (HFO-1132(E)), difluoromethane (HFC-32), and 2,3,3,3-tetrafluoropropene (HFO-1234yf), wherein the total concentration of the three components is 99.5% by mass or more, based on the entire refrigerant, and three components have a mass ratio that falls within a region surrounded by a figure passing through the following 4 points in a ternary composition diagram whose three vertices represent the three components:
point A (HFO-1132(E)/HFC-32/HFO-1234yf=51.8/1.0/47.2 mass %),
point B (HFO-1132(E)/HFC-32/HFO-1234yf=35.3/1.0/63.7 mass %),
point C (HFO-1132(E)/HFC-32/HFO-1234yf=10.1/18.0/71.9 mass %), and
point D (HFO-1132(E)/HFC-32/HFO-1234yf=27.8/18.0/54.2 mass %).

12 Claims, 3 Drawing Sheets

(56) References Cited

U.S. PATENT DOCUMENTS

| | | | |
|---|---|---|---|
| 2015/0051426 A1 | 2/2015 | Fukushima et al. | |
| 2015/0322232 A1 | 11/2015 | Hong et al. | |
| 2015/0322321 A1 | 11/2015 | Deur-Bert et al. | |
| 2015/0376486 A1 | 12/2015 | Hashimoto et al. | |
| 2016/0002518 A1 | 1/2016 | Taniguchi et al. | |
| 2016/0075927 A1 | 3/2016 | Fukushima | |
| 2016/0097569 A1 | 4/2016 | Matsunaga | |
| 2016/0333243 A1* | 11/2016 | Fukushima | C09K 5/044 |
| 2016/0333244 A1 | 11/2016 | Fukushima | |
| 2016/0340565 A1 | 11/2016 | Tasaka et al. | |
| 2016/0347980 A1 | 12/2016 | Okamoto | |
| 2017/0002245 A1 | 1/2017 | Fukushima | |
| 2017/0058171 A1 | 3/2017 | Fukushima et al. | |
| 2017/0058172 A1* | 3/2017 | Fukushima | C10M 105/32 |
| 2017/0058173 A1* | 3/2017 | Fukushima | C09K 5/045 |
| 2017/0058174 A1 | 3/2017 | Fukushima et al. | |
| 2017/0138642 A1 | 5/2017 | Ueno et al. | |
| 2017/0146284 A1 | 5/2017 | Matsunaga et al. | |
| 2017/0218241 A1 | 8/2017 | Deur-Bert et al. | |
| 2018/0051198 A1 | 2/2018 | Okamoto et al. | |
| 2018/0057724 A1 | 3/2018 | Fukushima | |
| 2018/0079941 A1 | 3/2018 | Ueno et al. | |
| 2018/0320942 A1 | 11/2018 | Hayamizu et al. | |
| 2020/0041174 A1 | 2/2020 | Wakabayashi et al. | |
| 2020/0048520 A1 | 2/2020 | Fukushima | |
| 2020/0079986 A1 | 3/2020 | Fukushima | |
| 2020/0326100 A1 | 10/2020 | Ukibune et al. | |
| 2020/0326103 A1 | 10/2020 | Kumakura et al. | |
| 2020/0326109 A1 | 10/2020 | Kumakura et al. | |
| 2020/0385622 A1 | 12/2020 | Itano et al. | |
| 2020/0393178 A1 | 12/2020 | Kumakura et al. | |
| 2021/0198549 A1 | 7/2021 | Fukushima | |
| 2022/0089928 A1 | 3/2022 | Fukushima | |
| 2022/0389299 A1 | 12/2022 | Itano et al. | |
| 2022/0404070 A1 | 12/2022 | Ohtsuka et al. | |
| 2023/0002659 A1 | 1/2023 | Itano et al. | |

FOREIGN PATENT DOCUMENTS

| | | | |
|---|---|---|---|
| CN | 104837951 | 8/2015 | |
| CN | 105164227 | 12/2015 | |
| CN | 105452417 | 3/2016 | |
| CN | 106029821 | 10/2016 | |
| CN | 106029823 | 10/2016 | |
| CN | 106133110 | 11/2016 | |
| CN | 106414654 | 2/2017 | |
| CN | 106414682 | 2/2017 | |
| CN | 107614651 | 1/2018 | |
| CN | 107614652 | 1/2018 | |
| CN | 108699428 | 10/2018 | |
| CN | 111032817 | 4/2020 | |
| CN | 111479894 | 7/2020 | |
| EP | 0 811 670 | 12/1997 | |
| EP | 3 012 556 | 4/2016 | |
| EP | 3 101 082 | 12/2016 | |
| EP | 3 109 292 | 12/2016 | |
| EP | 3 121 242 | 1/2017 | |
| EP | 3 153 559 | 4/2017 | |
| EP | 3 153 567 | 4/2017 | |
| EP | 3 305 869 | 4/2018 | |
| EP | 3 423 541 | 1/2019 | |
| EP | 3 666 848 | 6/2020 | |
| EP | 3 739 018 | 11/2020 | |
| EP | 3 825 382 | 5/2021 | |
| FR | 3 000 095 | 6/2014 | |
| GB | 2530915 | 4/2016 | |
| GB | 2566809 | 3/2019 | |
| JP | 9-324175 | 12/1997 | |
| JP | 2012-510550 | 5/2012 | |
| JP | 2013-529703 | 7/2013 | |
| JP | 5689068 | 3/2015 | |
| JP | 2015-214927 | 12/2015 | |
| JP | 2015-229767 | 12/2015 | |
| JP | 2016-11423 | 1/2016 | |
| JP | 2016-501978 | 1/2016 | |
| JP | 2016-028119 | 2/2016 | |
| JP | 2016-539208 | 12/2016 | |
| JP | 6105511 | 3/2017 | |
| JP | 2017-145380 | 8/2017 | |
| JP | 2018-104565 | 7/2018 | |
| JP | 2018-104566 | 7/2018 | |
| JP | 2018-177966 | 11/2018 | |
| JP | 2018-177967 | 11/2018 | |
| JP | 2018-177968 | 11/2018 | |
| JP | 2018-177969 | 11/2018 | |
| JP | 2018-179404 | 11/2018 | |
| JP | 2018-184597 | 11/2018 | |
| JP | 2019-34972 | 3/2019 | |
| JP | 2019-034983 | 3/2019 | |
| JP | 2019-512031 | 5/2019 | |
| JP | 2019-207054 | 12/2019 | |
| KR | 10-2011-0099253 | 9/2011 | |
| KR | 10-2015-0099530 | 8/2015 | |
| KR | 10-2018-0118174 | 10/2018 | |
| MX | 2018010417 | 11/2018 | |
| WO | 2005/105947 | 11/2005 | |
| WO | 2009/036537 | 3/2009 | |
| WO | 2010/059677 | 5/2010 | |
| WO | 2010/064011 | 6/2010 | |
| WO | 2011/163117 | 12/2011 | |
| WO | 2014/085973 | 6/2014 | |
| WO | 2014/102477 | 7/2014 | |
| WO | 2014/178352 | 11/2014 | |
| WO | 2014/203356 | 12/2014 | |
| WO | WO2014/203353 | 12/2014 | |
| WO | 2015/015881 | 2/2015 | |
| WO | 2015/054110 | 4/2015 | |
| WO | 2015/115252 | 8/2015 | |
| WO | 2015/125874 | 8/2015 | |
| WO | 2015/125885 | 8/2015 | |
| WO | 2015/141678 | 9/2015 | |
| WO | WO2015/136977 | 9/2015 | |
| WO | 2015/186557 | 12/2015 | |
| WO | 2015/186670 | 12/2015 | |
| WO | 2015/186671 | 12/2015 | |
| WO | WO2015/186558 | 12/2015 | |
| WO | WO-2015186557 A1 * | 12/2015 | C09K 5/04 |
| WO | 2016/075541 | 5/2016 | |
| WO | 2016/182030 | 11/2016 | |
| WO | 2016/190177 | 12/2016 | |
| WO | 2016/194847 | 12/2016 | |
| WO | 2017/122517 | 7/2017 | |
| WO | 2018/193974 | 10/2018 | |
| WO | 2019/030508 | 2/2019 | |
| WO | 2019/123782 | 6/2019 | |
| WO | 2019/124396 | 6/2019 | |
| WO | 2019/124398 | 6/2019 | |
| WO | 2019/124399 | 6/2019 | |
| WO | 2019/172008 | 9/2019 | |
| WO | 2020/017520 | 1/2020 | |
| WO | 2020/017521 | 1/2020 | |
| WO | 2020/017522 | 1/2020 | |
| WO | 2020/071380 | 4/2020 | |
| WO | 2020/256129 | 12/2020 | |
| WO | 2020/256131 | 12/2020 | |
| WO | 2020/256134 | 12/2020 | |

OTHER PUBLICATIONS

International Preliminary Report on Patentability dated Jan. 19, 2021 in International (PCT) Application No. PCT/JP2019/027990.

International Search Report dated Oct. 21, 2019 in International (PCT) Application No. PCT/JP2019/027990.

International Preliminary Report on Patentability dated Jul. 27, 2021 in International (PCT) Application No. PCT/JP2020/002974.

International Search Report dated Apr. 14, 2020 in International (PCT) Application No. PCT/JP2020/002974.

International Search Report dated Sep. 3, 2019 in International (PCT) Application No. PCT/JP2019/027031.

International Search Report dated Mar. 31, 2020 in International (PCT) Application No. PCT/JP2019/050501.

Extended European Search Report dated Apr. 21, 2021 in European Patent Application No. 19912660.8.

(56) References Cited

OTHER PUBLICATIONS

Takahashi et al., "Construction of Comprehensive Reaction Model for Predicting Tetrafluoroethylene Explosion by High-Pressure Shock Tube", (https://kaken.nii.ac.jp/), Research Result Report of Grants-in-Aid for Scientific Research, 2018, 4 pages, Abstract.
Otsuka et al., "Development of control method of HFO-1123 disproportionation and investigation of probability of HFO-1123 disproportionation", AGC Research Report, 2018, No. 68, pp. 29-33, Abstract.
International Search Report dated Mar. 31, 2020 in International (PCT) Application No. PCT/JP2020/003943.
International Search Report dated Mar. 31, 2020 in International (PCT) Application No. PCT/JP2020/003990.
International Search Report dated Jul. 21, 2020 in International (PCT) Application No. PCT/JP2020/016787.
International Search Report dated Jul. 28, 2020 in International (PCT) Application No. PCT/JP2020/17777.
International Search Report dated Jan. 28, 2020 in International (PCT) Application No. PCT/JP2019/047097.
Fei Qian, Chief Editor, Marine Auxiliary Engine, 3rd Ed., p. 224-225, Dalian Maritime University Press, Feb. 2008, with English translation.
Trane Air Conditioning Manual, Chapter X, The Air Conditioning System, pp. 303-359, 1996.

\* cited by examiner

COMPOSITION CONTAINING REFRIGERANT, REFRIGERATION METHOD USING SAID COMPOSITION, METHOD FOR OPERATING REFRIGERATION DEVICE, AND REFRIGERATION DEVICE

TECHNICAL FIELD

The present disclosure relates to a composition comprising a refrigerant; and a refrigeration method, a method for operating a refrigeration apparatus, and a refrigeration apparatus, all of which use the composition.

BACKGROUND ART

Amid worldwide discussion about global warming as a highly serious issue, the development of environmentally friendly air conditioners, refrigeration apparatuses, etc. has become increasingly important.

Various mixed refrigerants that have a low global warming potential (GWP) and that can replace R404A, which is used as a refrigerant for air conditioners, such as home air conditioners, are currently proposed. For example, Patent Literature (PTL) 1 and Patent Literature (PTL) 2 disclose, as an alternative refrigerant for R404A, a refrigerant composition comprising difluoromethane (R32), pentafluoroethane (R125), 2,3,3,3-tetrafluoropropene (R1234yf), and 1,1,1,2-tetrafluoroethane (R134a).

CITATION LIST

Patent Literature

PTL 1: Japanese Patent No. 5689068
PTL 2: JP2013-529703A

SUMMARY

The present disclosure provides the invention according to the following embodiments.

A composition comprising a refrigerant, the refrigerant comprising trans-1,2-difluoroethylene (HFO-1132(E)), difluoromethane (HFC-32), and 2,3,3,3-tetrafluoropropene (HFO-1234yf),
wherein the total concentration of the three components is 99.5 mass % or more, based on the entire refrigerant, and the three components have a mass ratio that falls within a region surrounded by a figure passing through the following 4 points in a ternary composition diagram whose three vertices represent the three components:
point A (HFO-1132(E)/HFC-32/HFO-1234yf=51.8/1.0/47.2 mass %),
point B (HFO-1132(E)/HFC-32/HFO-1234yf=35.3/1.0/63.7 mass %),
point C (HFO-1132(E)/HFC-32/HFO-1234yf=10.1/18.0/71.9 mass %), and
point D (HFO-1132(E)/HFC-32/HFO-1234yf=27.8/18.0/54.2 mass %).

Advantageous Effects

The composition comprising the refrigerant of the present disclosure has characteristics of having a coefficient of performance (COP) and a refrigerating capacity equivalent to or higher than those of R404A, and having a sufficiently low GWP.

DESCRIPTION OF EMBODIMENTS

Figure 1:
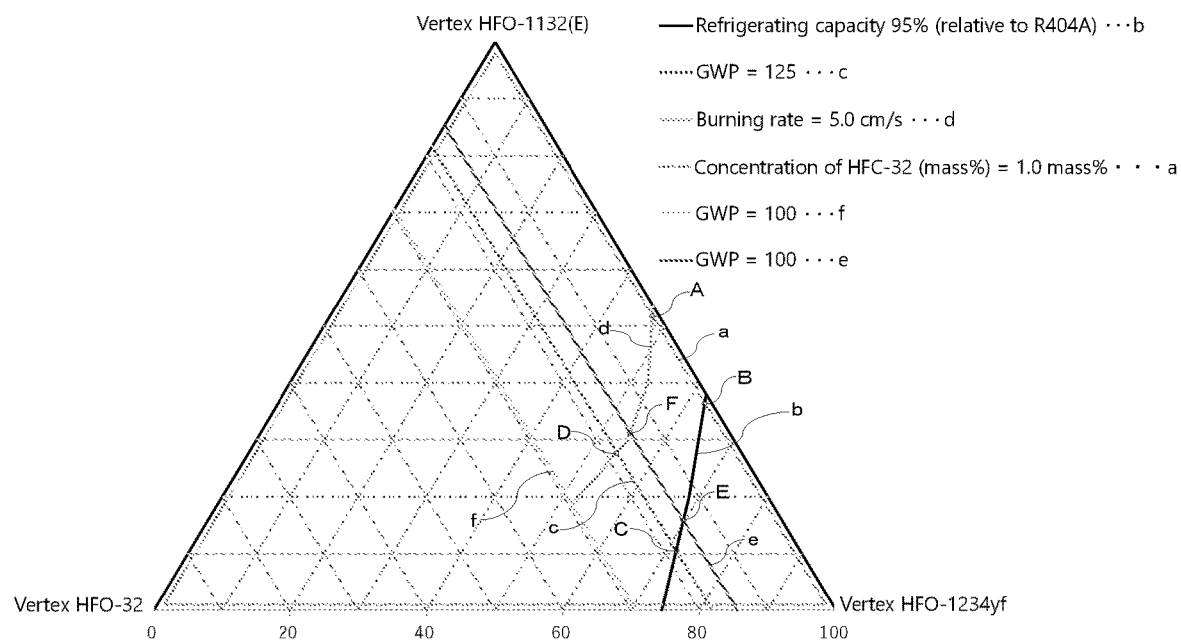
FIG. 1 shows the mass ratio of trans-1,2-difluoroethylene (HFO-1132(E)), difluoromethane (HFC-32), and 2,3,3,3-tetrafluoropropene (HFO-1234yf) contained in the refrigerant of the present disclosure (a region surrounded by a figure passing through the following 4 points: points A, B, C, and D; and a region surrounded by a figure passing through the following 4 points: points A, B, E, and F) in a ternary composition diagram of HFO-1132(E), HFC-32, and HFO-1234yf.

To solve the above problem, the present inventors conducted extensive research, and found that a composition comprising a mixed refrigerant containing trans-1,2-difluoroethylene (HFO-1132(E)), difluoromethane (HFC-32), and 2,3,3,3-tetrafluoropropene (HFO-1234yf) in a specific concentration has the above characteristics.

The present disclosure has been completed as a result of further research based on the above findings. The present disclosure includes the following embodiments.
Definition of Terms The numerical range expressed by using the term "to" in the present specification indicates a range that includes numerical values shown before and after "to" as the minimum and maximum values, respectively.

In the present specification, the terms "comprise" and "contain" include the concepts of "consisting essentially of" and "consisting of."

In the present specification, the term "refrigerant" includes at least compounds that are specified in ISO817 (International Organization for Standardization), and that are given a refrigerant number (ASHRAE number) representing the type of refrigerant with "R" at the beginning; and further includes refrigerants that have characteristics equivalent to those of such refrigerants, even if a refrigerant number is not yet given.

Refrigerants are roughly classified into fluorocarbon-based compounds and non-fluorocarbon-based compounds, in terms of the structure of the compound. Examples of fluorocarbon-based compounds include chlorofluorocarbons (CFC), hydrochlorofluorocarbons (HCFC), and hydrofluorocarbons (HFC). Examples of non-fluorocarbon-based compounds include propane (R290), propylene (R1270), butane (R600), isobutane (R600a), carbon dioxide (R744), ammonia (R717), and the like.

The term "composition comprising a refrigerant" used in the present specification includes at least:
(1) a refrigerant itself (including a mixture of refrigerants, i.e., a mixed refrigerant);
(2) a composition that further contains one or more other components and that can be used to obtain a working fluid for a refrigeration apparatus by being mixed with at least a refrigerant oil; and
(3) a working fluid for a refrigeration apparatus, the working fluid containing a refrigerant oil.

Among these three embodiments, composition (2) is referred to herein as a "refrigerant composition" to distinguish it from the refrigerant itself (including a mixed refrigerant). Further, the working fluid for a refrigeration apparatus (3) is referred to as "a refrigerant-oil-containing working fluid" to distinguish it from the "refrigerant composition."

In the present specification, when the term "alternative" is used in a context in which the first refrigerant is replaced with the second refrigerant, the first type of alternative means that equipment designed for operation using the first refrigerant can be operated using the second refrigerant under optimum conditions, optionally with only changing a few parts (at least one of the following: refrigerant oil, gasket, packing, expansion valve, dryer, other parts) and making equipment adjustments. In other words, this type of alternative means that the same equipment is operated with an alternative refrigerant. Embodiments of this type of alternative include drop-in alternatives, nearly drop-in alternatives, and retrofits, in the order in which the extent of changes and adjustment necessary for replacing the first refrigerant with the second refrigerant is smaller.

The term "alternative" also includes a second type of alternative with the meaning that equipment designed for operation using the second refrigerant is operated for the same use as the existing use with the first refrigerant, by using the second refrigerant. This type of alternative means that the same use is achieved with an alternative refrigerant.

In the present specification, the term "refrigeration apparatus" in the broad sense refers to apparatuses in general that draw heat from an object or space to make its temperature lower than the temperature of the ambient air, and maintain the low temperature. In other words, refrigeration apparatuses in the broad sense refer to conversion apparatuses that gain energy from the outside to do work, and that perform energy conversion, in order to transfer heat from where the temperature is lower to where the temperature is higher. In the present disclosure, the term "refrigeration apparatus" in the broad sense is synonymous with "heat pump."

In the present disclosure, the term "refrigeration apparatus" in the narrow sense is distinguished from "heat pump" depending on the difference in the applied temperature range and operating temperature. In this case, an apparatus whose low-temperature heat source is placed in a temperature range lower than the air temperature may be called a "refrigeration apparatus," while an apparatus whose low-temperature heat source is placed near the air temperature to use the heat-release action caused by driving the refrigeration cycle may be called a "heat pump." Additionally, there are apparatuses that have both the function of refrigeration apparatuses in the narrow sense and the function of heat pumps in the narrow sense, despite them being a single machine, such as air conditioners that provide both a cooling mode and a heating mode. In the present specification, unless otherwise indicated, the terms "refrigeration apparatus" and "heat pump" are used in the broad sense throughout the specification.

In the present specification, the term "temperature glide" can be rephrased as an absolute value of the difference between the starting temperature and the ending temperature of the phase change process of the composition comprising the refrigerant of the present disclosure within the constituent elements of a heat cycle system.

In the present specification, the term "air-conditioning system for vehicles" is a type of refrigeration apparatus for use in vehicles, such as gasoline vehicles, hybrid vehicles, electric vehicles, and hydrogen vehicles. The air-conditioning system for vehicles refers to a refrigeration apparatus that has a refrigeration cycle in which heat exchange is performed by an evaporator using a liquid refrigerant, the evaporated refrigerant gas is absorbed by a compressor, the adiabatically compressed refrigerant gas is cooled and liquefied with a condenser, the liquefied refrigerant is adiabatically expanded by passing it through an expansion valve, and then the refrigerant is supplied again in the form of a liquid to the evaporator.

In the present specification, the term "turbo refrigerating machine" is a type of large chiller refrigeration apparatus. Turbo refrigerating machine refers to a refrigeration apparatus that has a refrigeration cycle in which heat exchange is performed by an evaporator using a liquid refrigerant, the evaporated refrigerant gas is absorbed by a centrifugal compressor, the adiabatically compressed refrigerant gas is cooled and liquefied with a condenser, the liquefied refrigerant is adiabatically expanded by passing it through an expansion valve, and then the refrigerant is supplied again in the form of a liquid to the evaporator. The term "large chiller refrigerating machine" refers to a large air-conditioner that is intended for air conditioning in a unit of a building.

In the present specification, the term "saturation pressure" refers to a pressure of saturated vapor.

In the present specification, the term "discharge temperature" refers to a temperature of the mixed refrigerant at the outlet of a compressor.

In the present specification, the term "evaporation pressure" refers to a saturation pressure at an evaporation temperature.

In the present specification, the term "critical temperature" refers to a temperature at the critical point, or a boundary temperature that is such that unless the temperature is equivalent to or lower than the boundary temperature, gas would not be converted into a liquid by compressing the gas.

The technical meanings of "non-flammable" and "lower flammability" in the present specification are as follows.

In the present specification, "non-flammable" refrigerants refer to those whose worst case of formulation for flammability (WCF), which is the most flammable composition in the allowable refrigerant concentration range according to the US ANSI/ASHRAE Standard 34-2013, is classified as Class 1.

In the present specification, "lower flammability" refrigerants refer to those whose WCF compositions are classified as Class 2L according to the US ANSI/ASHRAE Standard 34-2013.

In the present specification, GWP is evaluated based on the values shown in the fourth report of the Intergovernmental Panel on Climate Change (IPCC).

In the present specification, the description of "mass ratio" is synonymous with the description of "composition ratio."

1. Composition

The composition according to the present disclosure contains a refrigerant. Examples of the refrigerant include "refrigerant 1" and "refrigerant 2." Refrigerant 1 and refrigerant 2 are each explained below. In the present disclosure, refrigerant 1 and refrigerant 2 are each a mixed refrigerant.

In the present specification, the "refrigerant of the present disclosure" means refrigerant 1 and refrigerant 2.

The refrigerant according to the present disclosure can be roughly classified into embodiment 1 and embodiment 2 (also referred to as refrigerant 1 and refrigerant 2, respectively), according to the embodiment.

1.1 Refrigerant Component

Embodiment 1: Refrigerant 1

Refrigerant 1 is a mixed refrigerant containing HFO-1132(E), HFC-32, and HFO-1234yf as essential components. In this disclosure, HFO-1132(E), HFC-32, and HFO-1234yf are hereinafter also referred to as "three components."

The total concentration of the three components in the entire refrigerant 1 is 99.5 mass % or more. In other words, refrigerant 1 contains the three components in amounts such that the sum of the concentrations of the three components is 99.5 mass % or more.

In refrigerant 1, the three components have a mass ratio that falls within a region surrounded by a figure passing through the following 4 points in a ternary composition diagram whose three vertices represent the three components:
point A (HFO-1132(E)/HFC-32/HFO-1234yf=51.8/1.0/47.2 mass %),
point B (HFO-1132(E)/HFC-32/HFO-1234yf=35.3/1.0/63.7 mass %),
point C (HFO-1132(E)/HFC-32/HFO-1234yf=10.1/18.0/71.9 mass %), and
point D (HFO-1132(E)/HFC-32/HFO-1234yf=27.8/18.0/54.2 mass %).

In other words, the three components in refrigerant 1 have a mass ratio that falls within a region surrounded by straight line a, curve b, straight c, and curve d connecting the following 4 points in a ternary composition diagram of FIG. 1 whose three vertices represent the three components:
point A (HFO-1132(E)/HFC-32/HFO-1234yf=51.8/1.0/47.2 mass %),
point B (HFO-1132(E)/HFC-32/HFO-1234yf=35.3/1.0/63.7 mass %),
point C (HFO-1132(E)/HFC-32/HFO-1234yf=10.1/18.0/71.9 mass %), and
point D (HFO-1132(E)/HFC-32/HFO-1234yf=27.8/18.0/54.2 mass %).

In this embodiment, the ternary composition diagram whose three vertices represent the three components refers to a ternary composition diagram in which the three components (HFO-1132(E), HFC-32, and HFO-1234yf) are plotted at the vertices of the diagram, and the total concentration of HFO-1132(E), HFC-32, and HFO-1234yf is 100 mass %.

Refrigerant 1, which has the above feature, has the following characteristics:
(1) the GWP is sufficiently low (125 or less);
(2) when used as an alternative refrigerant for R404A, refrigerant 1 has a refrigerating capacity that is equivalent to or higher than that of R404A and has a coefficient of performance (COP) that is equivalent to or higher than that of R404A; and
(3) the burning velocity as measured in accordance with ASHRAE Standard 34-2013 is 5.0 cm/sec or less.

In this disclosure, the coefficient of performance (COP) that is equivalent to or higher than that of R404A means that the COP ratio is 100% or more (preferably 102% or more, more preferably 103% or more), relative to that of R404A. A refrigerating capacity that is equivalent to or higher than that of R404A means that the refrigerating capacity ratio is 95% or more (preferably 100% or more, more preferably 102% or more, and most preferably 103% or more), relative to that of R404A. Further, the GWP being sufficiently low means that the GWP is 125 or less, preferably 110 or less, more preferably 100 or less, and even more preferably 75 or less.

In FIG. 1, points A, B, C, and D, which are indicated by white circles (O), have the coordinates described above.

The technical meanings of points A, B, C, and D are as follows. The concentration (mass %) at each point is the same as the value obtained in the Examples described later.
A: the mass ratio at which the burning velocity as measured according to ANSI/ASHRAE Standard 34-2013 is 5.0 cm/s and the concentration (mass %) of HFC-32 is 1.0 mass %.
B: the mass ratio at which the concentration (mass %) of HFC-32 is 1.0 mass % and the refrigerating capacity is 95% relative to that of R404A.
C: the mass ratio at which the refrigerating capacity is 95% relative to that of R404A, and the GWP is 125.
D: the mass ratio at which the GWP is 125, and the burning velocity as measured according to ANSI/ASHRAE Standard 34-2013 is 5.0 cm/s.

The phrase "the burning velocity as measured according to ANSI/ASHRAE Standard 34-2013 is 5.0 cm/s" means that the burning velocity is half the burning velocity (10 cm/s), which is the standard for classifying a refrigerant into class 2L (lower flammability) according to ANSI/ASHRAE Standard 34-2013, and that the refrigerant is relatively safe among the refrigerants in Class 2L. Specifically, a refrigerant having a burning velocity that is "half the burning velocity (10 cm/s)" is relatively safe in that the flame does not easily propagate even if ignition occurs. The burning velocity as measured according to ANSI/ASHRAE Standard 34-2013 is also simply referred to as "burning velocity."

In refrigerant 1, the burning velocity of the mixed refrigerant of the three components is preferably more than 0 to 4.5 cm/s, more preferably more than 0 to 4.0 cm/s, even more preferably more than 0 to 3.5 cm/s, and particularly preferably more than 0 to 3.0 cm/s.

Points A and B are both on straight line a. That is, line segment AB is a part of straight line a. Straight line a is a straight line representing the mass ratio at which the concentration (mass %) of HFC-32 is 1.0 mass %. In the region on the vertex HFC-32 side of straight line a in the ternary composition diagram, the concentration of HFC-32 in the mixed refrigerant of the three components is more than 1.0 mass %. In the region on the vertex HFC-32 side of straight line a in the ternary composition diagram, the refrigerating capacity is unexpectedly high.

In FIG. 1, when the mass % of HFO-1132(E) is x, the mass % of HFC-32 is y, and the mass % of HFO-1234yf is z, a line segment representing the mass ratio at which the concentration of HFC-32 is 1.0 mass % is approximated by a line segment represented by the following equations.

Line segment representing the mass ratio at which the concentration of HFC-32 is 1.0 mass %: a part of straight line a connecting two points that are point A and point B (line segment AB in FIG. 1)

$$y=1.0$$

$$z=100-x-y$$

$$35.3 \leq x \leq 51.8$$

Points B and C are both on curve b. Curve b is a curve representing the mass ratio at which the refrigerating capacity is 95% relative to that of R404A. In the region on the vertex HFO-1132(E) side of curve b and on the vertex HFC-32 side of curve b in the ternary composition diagram, the refrigerating capacity of the mixed refrigerant of the three components is more than 95% relative to that of R404A.

Curve b is obtained as follows.

Table 1 shows 4 points at which the refrigerating capacity ratio is 95% relative to that of R404A when HFO-1132(E)=1.0, 10.1, 20.0, and 35.3 mass %. Curve b is shown by a line connecting these 4 points. When the mass % of HFO-1132(E) is x, the mass % of HFC-32 is y, and the mass % of HFO-1234yf is z, curve b is approximated by the equations shown in Table 1 by using the least squares method.

TABLE 1

| Item | Unit | $b_{HFO-1132\ (E)-}$ | $b_{HFO-1132\ (E)-}$ | $b_{HFO-1132\ (E)-}$ | $b_{HFO-1132\ (E)-}$ |
|---|---|---|---|---|---|
| HFO-1132(E) | mass % | 1.0 | 10.1 | 20.0 | 35.3 |
| HFC-32 | mass % | 24.8 | 18.0 | 11.0 | 1.0 |
| HFO-1234yf | mass % | 74.2 | 71.9 | 69.0 | 63.7 |
| Refrigerating capacity | relative to R404A (%) | 95.0 | 95.0 | 95.0 | 95.0 |
| x = HFO-1132(E) | mass % | | | | |
| y = HFC-32 | mass % | | Equation of curve b | | |
| | | | $y = 0.001603x^2 - 0.7552x + 25.62$ | | |
| z = HFO-1234yf | mass % | | $z = 100 - x - y$ | | |

Points C and D are both on straight line c. That is, line segment CD is a part of straight line c. Straight line c is a straight line representing the mass ratio at which the GWP is 125. In the region on the vertex HFO-1132(E) side of straight line c and on the vertex HFO-1234yf side of straight line c in the ternary composition diagram, the GWP of the mixed refrigerant of the three components is less than 125.

In FIG. 1, when the mass % of HFO-1132(E) is x, the mass % of HFC-32 is y, and the mass % of HFO-1234yf is z, a line segment representing the mass ratio at which GWP=125 is approximated by the line segment represented by the following equations.

Line segment representing the mass ratio at which GWP=125: a part of straight line c connecting two points that are point C and point D (line segment CD in FIG. 1)

$$y=18.0$$

$$z=100-x-y$$

$$10.1 \leq x \leq 27.8$$

Points A and D are both on curve d. Curve d is a curve representing the mass ratio at which the burning velocity is 5.0 cm/s. In the region on the vertex HFO-1234yf side of curve d in the ternary composition diagram, the burning velocity of the mixed refrigerant of the three components is less than 5.0 cm/s.

Curve d is obtained as follows.

Table 2 shows 4 points at which the refrigerant has WCF lower flammability when HFO-1132(E)=18.0, 30.0, 40.0, and 53.5 mass %. Curve d is shown as a line connecting these 4 points. When the mass % of HFO-1132(E) is x, the mass % of HFC-32 is y, and the mass % of HFO-1234yf is z, curve d is approximated by the equations shown in Table 2 by using the least squares method.

When the ternary mixed refrigerant of HFO-1132(E), HFC-32, and HFO-1234yf has a mass within a region surrounded by lines connecting 4 points that are points A, B, C, and D (ABCD region), the GWP is 125 or less, the refrigerating capacity is 95% or more relative to that of R404A, and the burning velocity is 5.0 cm/s or less.

The mass ratio of the three components in refrigerant 1 is preferably within a region surrounded by a figure passing through the following 4 points in a ternary composition diagram whose three vertices represent the three components:

point A (HFO-1132(E)/HFC-32/HFO-1234yf=51.8/1.0/47.2 mass %),
point B (HFO-1132(E)/HFC-32/HFO-1234yf=35.3/1.0/63.7 mass %),
point E (HFO-1132(E)/HFC-32/HFO-1234yf=15.2/14.3/70.5 mass %), and
point F (HFO-1132(E)/HFC-32/HFO-1234yf=31.1/14.3/54.6 mass %).

In other words, the three components in refrigerant 1 have a mass ratio that falls within a region surrounded by straight line a, curve b, straight line e, and curve d connecting the following 4 points in the ternary composition diagram of FIG. 1 whose three vertices represent the three components:

point A (HFO-1132(E)/HFC-32/HFO-1234yf=51.8/1.0/47.2 mass %),
point B (HFO-1132(E)/HFC-32/HFO-1234yf=35.3/1.0/63.7 mass %),
point E (HFO-1132(E)/HFC-32/HFO-1234yf=15.2/14.3/70.5 mass %), and
point F (HFO-1132(E)/HFC-32/HFO-1234yf=31.1/14.3/54.6 mass %).

The ternary composition diagram whose three vertices represent the three components is as described above.

In FIG. 1, points A, B, E, and F, which are indicated by white circles (○), have the coordinates described above.

The technical meanings of points A and B are as described above.

The technical meanings of points E and F are as described above. The concentration (mass %) at each point is the same as the value obtained in the Examples described later.

TABLE 2

| Item | Unit | $d_{HFO-1132\ (E)-}$ | $d_{HFO-1132\ (E)-}$ | $d_{HFO-1132\ (E)-}$ | $d_{HFO-1132\ (E)-}$ |
|---|---|---|---|---|---|
| HFO-1132(E) | mass % | 18.0 | 30.0 | 40.0 | 53.5 |
| HFC-32 | mass % | 30.0 | 15.5 | 7.5 | 0.0 |
| HFO-1234yf | mass % | 52.0 | 54.5 | 52.5 | 46.5 |
| Burning velocity | cm/s | 5.0 | 5.0 | 5.0 | 5.0 |
| x = HFO-1132(E) | mass % | | | | |
| y = HFC-32 | mass % | | Equation of curve d | | |
| | | | $y = 0.014211x^2 - 1.8563x + 58.71$ | | |
| z = HFO-1234yf | mass % | | $z = 100 - x - y$ | | |

E: the mass ratio at which the refrigerating capacity is 95% relative to that of R404A, and the GWP is 100.

F: the mass ratio at which the burning velocity as measured according to ANSI/ASHRAE Standard 34-2013 is 5.0 cm/s and the GWP is 100.

Straight line a and curve b are as described above. Point E is on curve b.

Points E and F are both on straight line e. That is, line segment EF is a part of straight line e. Straight line e is a straight line representing the mass ratio at which the GWP is 100. In the region on the vertex HFO-1132(E) side of straight line e and on the vertex HFO-1234yf side of straight line e in the ternary composition diagram, the GWP of a mixed refrigerant of the three components is less than 100.

In FIG. 1, when the mass % of HFO-1132(E) is x, the mass % of HFC-32 is y, and the mass % of HFO-1234yf is z, a line segment representing the mass ratio at which GWP=100 is approximated by a line segment represented by the following equations.

Line segment representing the mass ratio at which GWP=100: a part of straight line e connecting two points that are point E and point F (line segment EF in FIG. 1)

$$y=14.3$$

$$z=100-x-y$$

$$15.2 \leq x \leq 31.1$$

Points A and F are both on curve d. Curve d is as described above.

When the ternary mixed refrigerant of HFO-1132(E), HFC-32, and HFO-1234yf has a mass ratio that falls within a region surrounded by lines connecting 4 points that are points A, B, E, and F (ABEF region), the mixed refrigerant has a GWP of 100 or less, a refrigerating capacity of 95% or more relative to that of R404A, and a burning velocity of 5.0 cm/s or less.

Refrigerant 1 contains HFO-1132(E), HFC-32, and HFO-1234yf in amounts such that the sum of their concentrations is 99.5 mass % or more. In particular, the total amount of HFO-1132(E), HFC-32, and HFO-1234yf in the entire refrigerant 1 is preferably 99.7 mass % or more, more preferably 99.8 mass % or more, and even more preferably 99.9 mass % or more.

Refrigerant 1 can contain one or more other refrigerants in addition to HFO-1132(E), HFC-32, and HFO-1234yf, as long as the above characteristics are not impaired. In this case, the content of such other refrigerants in the entire refrigerant 1 is preferably 0.5 mass % or less, more preferably 0.3 mass % or less, even more preferably 0.2 mass % or less, and particularly preferably 0.1 mass % or less. Such other refrigerants are not limited, and can be selected from a wide range of known refrigerants widely used in the field. Refrigerant 1 may comprise another refrigerant, or two or more other refrigerants.

Refrigerant 1 particularly preferably consists of HFO-1132(E), HFC-32, and HFO-1234yf. In other words, the total concentration of HFO-1132(E), HFC-32, and HFO-1234yf in the entire refrigerant 1 is particularly preferably 100 mass %.

When refrigerant 1 consists of HFO-1132(E), HFC-32, and HFO-1234yf, the three components preferably have a mass ratio that falls within a region surrounded by a figure passing through the following 4 points in a ternary composition diagram whose three vertices represent the three components:

point A (HFO-1132(E)/HFC-32/HFO-1234yf=51.8/1.0/47.2 mass %), point B (HFO-1132(E)/HFC-32/HFO-1234yf=35.3/1.0/63.7 mass %), point C (HFO-1132(E)/HFC-32/HFO-1234yf=10.1/18.0/71.9 mass %), and point D (HFO-1132(E)/HFC-32/HFO-1234yf=27.8/18.0/54.2 mass %).

The technical meanings of points A, B, C, and D are as described above. The region surrounded by a figure passing through 4 points that are points A, B, C, and D is as described above.

In this case, when the ternary mixed refrigerant of HFO-1132(E), HFC-32, and HFO-1234yf has a mass ratio that falls within a region surrounded by lines connecting 4 points that are points A, B, C, and D (ABCD region), the mixed refrigerant has a GWP of 125 or less, a refrigerating capacity of 95% or more relative to that of R404A, and a burning velocity of 5.0 cm/s or less.

When refrigerant 1 consists of HFO-1132(E), HFC-32, and HFO-1234yf, the mass ratio of the three components preferably falls within a region surrounded by a figure connecting the following 4 points in a ternary composition diagram whose three vertices represent the three components:

point A (HFO-1132(E)/HFC-32/HFO-1234yf=51.8/1.0/47.2 mass %), point B (HFO-1132(E)/HFC-32/HFO-1234yf=35.3/1.0/63.7 mass %), point E (HFO-1132(E)/HFC-32/HFO-1234yf=15.2/14.3/70.5 mass %), and point F (HFO-1132(E)/HFC-32/HFO-1234yf=31.1/14.3/54.6 mass %).

The technical meanings of points A, B, E, and F are as described above. The region surrounded by a figure passing through 4 points that are point A, point B, point E, and point F is as described above.

In this case, when the ternary mixed refrigerant of HFO-1132(E), HFC-32, and HFO-1234yf has a mass ratio that falls within a region (ABEF region) surrounded by lines connecting 4 points that are points A, B, E, and F, the mixed refrigerant has a GWP of 100 or less, a refrigerating capacity of 95% or more relative to that of R404A, and a burning velocity of 5.0 cm/s or less.

Refrigerant 1, which has a GWP of 125 or less, can significantly reduce burden on the environment from a global warming perspective, as compared with other general-purpose refrigerants.

Second Embodiment: Refrigerant 2

Refrigerant 2 is a mixed refrigerant containing HFO-1132(E), HFC-32, and HFO-1234yf as essential components. In this embodiment, HFO-1132(E), HFC-32, and HFO-1234yf are hereinafter also referred to as "three components."

The total concentration of the three components in the entire refrigerant 2 is 99.5 mass %. In other words, refrigerant 2 contains the three components in amounts such that the sum of their concentrations is 99.5 mass % or more.

In refrigerant 2, the three components have a mass ratio that falls within a region surrounded by a figure passing through the following 5 points in a ternary composition diagram whose three vertices represent the three components:

point P (HFO-1132(E)/HFC-32/HFO-1234yf=45.6/1.0/53.4 mass %), point B (HFO-1132(E)/HFC-32/HFO-1234yf=35.3/1.0/63.7 mass %), point Q (HFO-1132(E)/HFC-32/HFO-1234yf=1.0/24.8/74.2 mass %), point R (HFO-1132(E)/HFC-32/HFO-1234yf=1.0/29.2/69.8 mass %), and point S (HFO-1132(E)/HFC-32/HFO-1234yf=6.5/29.2/64.3 mass %).

Figure 2:
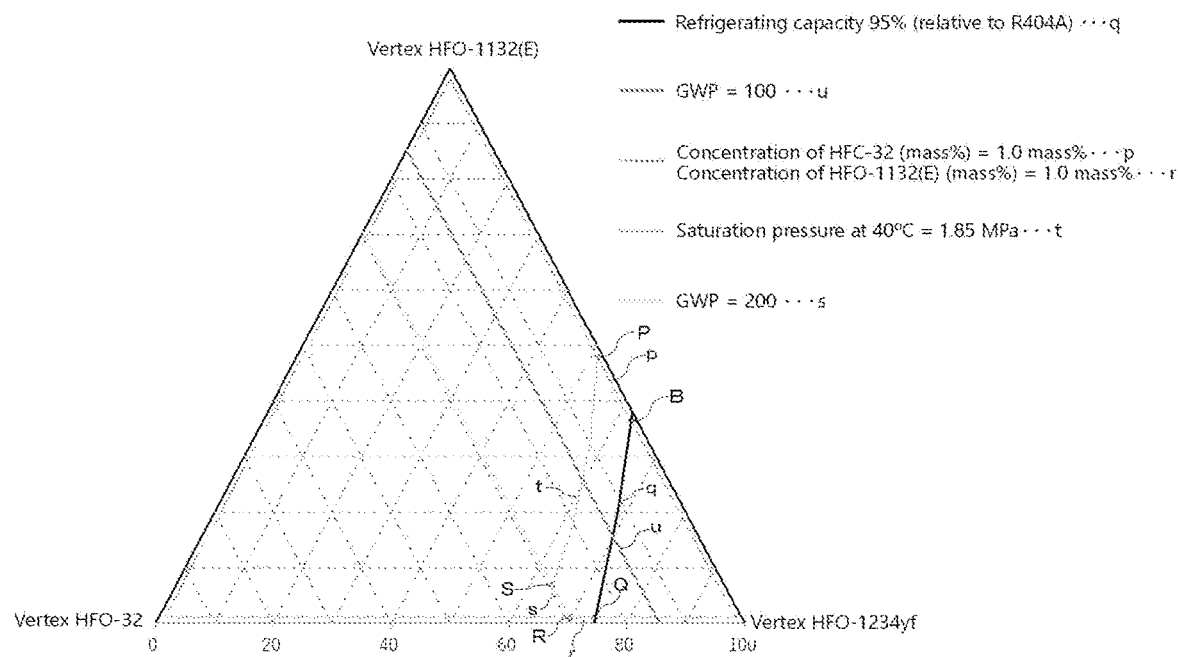
FIG. 2 shows the mass ratio of HFO-1132(E), HFC-32, and HFO-1234yf contained in the refrigerant of the present disclosure (a region surrounded by a figure passing through the following 5 points: points P, B, Q, R, and S) in a ternary composition diagram of HFO-1132(E), HFC-32, and HFO-1234yf.

In other words, the three components in refrigerant 2 have a mass ratio that falls within a region surrounded by straight line p, curve q, straight line r, straight line s, and curve t that connect the following 5 points in the ternary composition diagram of FIG. 2 whose three vertices represent the three components:

point P (HFO-1132(E)/HFC-32/HFO-1234yf=45.6/1.0/53.4 mass %), point B (HFO-1132(E)/HFC-32/HFO-1234yf=35.3/1.0/63.7 mass %), point Q (HFO-1132(E)/HFC-32/HFO-1234yf=1.0/24.8/74.2 mass %), point R (HFO-1132(E)/HFC-32/HFO-1234yf=1.0)/29.2/69.8 mass %), and point S (HFO-1132(E)/HFC-32/HFO-1234yf=6.5/29.2/64.3 mass %).

In this embodiment, the ternary composition diagram whose three vertices represent the three components refers to a ternary composition diagram in which the three components (HFO-1132(E), HFC-32, and HFO-1234yf) are plotted at the vertices of the diagram, and the total concentration of HFO-1132(E), HFC-32, and HFO-1234yf is 100 mass %, as shown in FIG. 2.

Refrigerant 2, which has the above structural feature, has the following characteristics:

(1) the GWP is sufficiently low (200 or less);

(2) when used as an alternative refrigerant for R404A, refrigerant 1 has a refrigerating capacity that is equivalent to or higher than that of R404A, and has a coefficient of performance (COP) that is equivalent to or higher than that of R404A; and (3) the pressure at 40° C. is 1.85 MPa or less.

In this section, the phrase "the coefficient of performance (COP) that is equivalent to or higher than that of R404A" means that the COP ratio is 100% or more (preferably 102% or more, and more preferably 103% or more) relative to that of R404A. The phrase "refrigerating capacity that is equivalent to or higher than that of R404A" means that the refrigerating capacity ratio relative to that of R404A is 95% or more (preferably 100% or more, more preferably 102% or more, and most preferably 103% or more). The phrase "sufficiently low GWP" means that the GWP is 200 or less, preferably 150 or less, more preferably 125 or less, and even more preferably 100 or less.

In FIG. 2, point P, point B, point Q, point R, and point S, which are indicated by white circles (○), have the coordinates described above.

The technical meanings of point P, point B, point Q, point R, and point S are as follows. The concentration (mass %) at each point is the same as the value obtained in the Examples described later.

P: the mass ratio at which the pressure at 40° C. is 1.85 MPa, and the concentration (mass %) of HFC-32 is 1.0 mass %;

B: the mass ratio at which the concentration (mass %) of HFC-32 is 1.0 mass % and the refrigerating capacity is 95% relative to that of R404A.

Q: the mass ratio at which the refrigerating capacity is 95% relative to that of R404A, and the concentration (mass %) of HFO-1132(E) is 1.0 mass %;

R: the mass ratio at which the concentration (mass %) of HFO-1132(E) is 1.0 mass %, and the GWP is 200; and S: the mass ratio at which the GWP is 200, and the pressure at 40° C. is 1.85 MPa.

The "mass ratio at which the pressure at 40° C. is 1.85 MPa" means the mass ratio at which the saturation pressure at a temperature of 40° C. is 1.85 MPa.

In refrigerant 2, when the saturation pressure of the mixed refrigerant of the three components at 40° C. exceeds 1.85 MPa, design changes from a refrigeration apparatus for R404A are necessary. The saturation pressure of the mixed refrigerant of the three components at 40° C. is preferably 1.50 to 1.85 MPa, more preferably 1.60 to 1.85 MPa, even more preferably 1.70 to 1.85 MPa, and particularly preferably 1.75 to 1.85 MPa.

Points P and B are both on straight line p. That is, line segment PB is a part of straight line p. Straight line p is a straight line representing the mass ratio at which the concentration (mass %) of HFC-32 is 1.0 mass %. In the region on the vertex HFC-32 side of straight line p in the ternary composition diagram, the concentration of HFC-32 in the mixed refrigerant of the three components is more than 1.0 mass %. In the region on the vertex HFC-32 side of straight line p in the ternary composition diagram, the refrigerating capacity is unexpectedly high.

In FIG. 2, when the mass % of HFO-1132(E) is x, the mass % of HFC-32 is y, and the mass % of HFO-1234yf is z, a line segment representing the mass ratio at which the concentration of HFC-32 is 1.0 mass % is approximated by a line segment represented by the following equations.

Line segment representing the mass ratio at which the concentration (mass %) of HFC-32 is 1.0 mass %: a part of straight line p connecting 2 points that are point P and point B (line segment PB in FIG. 2).

$$y=1.0$$

$$z=100-x-y$$

$$35.3 \le x \le 45.6$$

Points B and Q are both on curve q. Curve q is a curve indicating the mass ratio at which the refrigerating capacity is 95% relative to that of R404A. In the region on the vertex HFO-1132(E) side of curve q and on the vertex HFC-32 side of curve q in the ternary composition diagram, the refrigerating capacity of the mixed refrigerant of the three components is more than 95% relative to that of R404A.

Curve q is obtained as follows.

Table 3 shows 4 points at which the refrigerating capacity ratio is 95% relative to R404A when HFO-1132(E)=1.0, 10.1, 20.0, and 35.3 mass %. Curve q is shown as a line connecting these 4 points. When the mass % of HFO-1132(E) is x, the mass % of HFC-32 is y, and the mass % of HFO-1234yf is z, curve q is approximated by the equations shown in Table 3 by the least squares method.

TABLE 3

| Item | Unit | $q_{HFO\text{-}1132\,(E)}=$ | $q_{HFO\text{-}1132\,(E)}=$ | $q_{HFO\text{-}1132\,(E)}=$ | $q_{HFO\text{-}1132\,(E)}=$ |
|---|---|---|---|---|---|
| HFO-1132(E) | mass % | 1.0 | 10.1 | 20.0 | 35.3 |
| HFC-32 | mass % | 24.8 | 18.0 | 11.0 | 1.0 |
| HFO-1234yf | mass % | 74.2 | 71.9 | 69.0 | 63.7 |
| Refrigerating capacity | relative to R404A (%) | 95 | 95 | 95 | 95 |
| x = HFO-1132(E) | mass % | Equation of curve q | | | |
| y = HFC-32 | mass % | $y = 0.001603x^2 - 0.7552x + 25.62$ | | | |
| z = HFO-1234yf | mass % | $z = 100 - x - y$ | | | |

Points Q and R are both on straight line r. That is, line segment QR is a part of straight line r. Straight line r is a straight line representing the mass ratio at which the concentration (mass %) of HFO-1132(E) is 1.0 mass %. In the region on the vertex HFO-1132(E) side of straight line r in the ternary composition diagram, the concentration of HFO-1132(E) of the mixed refrigerant of the three components is more than 1.0 mass %. In the region on the vertex HFO-1132(E) side of straight line r in the ternary composition diagram, the refrigerating capacity is unexpectedly high.

In FIG. 2, when the mass % of HFO-1132(E)=x, the mass % of HFC-32=y, and the mass % of HFO-1234yf=z, a line segment representing the mass ratio at which the concentration of HFO-1132(E) is 1.0 mass % is approximated by a line segment represented by the following equations.

Line segment representing the mass ratio at which amount of HFO-1132(E) is 1.0 mass %: a part of straight line r connecting two points that are point Q and point R (line segment QR in FIG. 2)

$x=1.0$ $z=100-x-y$ $24.8 \le y \le 29.2$.

Points R and S are both on straight line s. That is, line segment RS is a part of straight line s. Straight line s is a straight line representing the mass ratio at which GWP=200. In the region on the vertex HFO-1132(E) side of straight line s and on the vertex HFO-1234yf side of straight line s in the ternary composition diagram, the mixed refrigerant of the three components has a GWP of less than 200.

In FIG. 2, when the mass % of HFO-1132(E) is x, the mass % of HFC-32 is y, and the mass % of HFO-1234yf is z, a line segment representing the mass ratio at which GWP=200 is approximated by a line segment represented by the following equations.

Line segment representing the mass ratio at which GWP=200: a part of straight line s connecting two points that are point R and point S (line segment RS in FIG. 2)

$y=29.2$ $z=100-x-y$ $1.0 \le x \le 6.5$

Points P and S are both on curve t. Curve t is a curve representing the mass ratio at which the pressure at 40° C. is 1.85 MPa. In the region on the vertex HFO-1234yf side of curve t in the ternary composition diagram, the pressure of the mixed refrigerant of the three components at 40° C. is less than 1.85 MPa.

Curve t is obtained as follows.

Table 4 shows 4 points at which the pressure at 40° C. is 1.85 MPa when HFO-1132(E)=5.6, 17.0, 30.7, and 45.6 mass %. Curve t is shown as a line connecting these 4 points. When the mass % of HFO-1132(E) is x, the mass % of HFC-32 is y, and the mass % of HFO-1234yf is z, curve t is approximated by the equations shown in Table 4 by using the least squares method.

TABLE 4

| Item | Unit | $t_{HFO\text{-}1132\,(E)}=$ | $t_{HFO\text{-}1132\,(E)}=$ | $t_{HFO\text{-}1132\,(E)}=$ | $t_{HFO\text{-}1132\,(E)}=$ |
|---|---|---|---|---|---|
| HFO-1132 (E) | mass % | 5.6 | 17.0 | 30.7 | 45.6 |
| HFC-32 | mass % | 30.0 | 20.0 | 10.0 | 1.0 |
| HFO-1234yf | mass % | 64.4 | 63.0 | 59.3 | 53.4 |
| Pressure at 40° C. | Mpa | 1.850 | 1.850 | 1.850 | 1.850 |
| x = HFO-1132 (E) | mass % | Equation of curve t | | | |
| y = HFC-32 | mass % | $y = 0.005016x^2 - 0.9805x + 35.30$ | | | |
| z = HFO-1234yf | mass % | $z = 100 - x - y$ | | | |

When the ternary mixed refrigerant of HFO-1132(E), HFC-32, and HFO-1234yf has a mass within a region surrounded by lines connecting 5 points that are points P, B, Q, R, and S (PBQRS region), the refrigerant has a GWP of 200 or less, a refrigerating capacity of 95% or more relative to that of R404A, and has a pressure at 40° C. of 1.85 MPa or less.

Refrigerant 2 contains HFO-1132(E), HFC-32, and HFO-1234yf in amounts such that the sum of their concentrations is 99.5 mass % or more. In particular, the total amount of HFO-1132(E), HFC-32, and HFO-1234yf in the entire refrigerant 2 is preferably 99.7 mass % or more, more preferably 99.8 mass % or more, and even more preferably 99.9 mass % or more.

Refrigerant 2 can contain one or more other refrigerants in addition to HFO-1132(E), HFC-32, and HFO-1234yf, as long as the above characteristics are not impaired. In this case, the content of such other refrigerants in the entire refrigerant 2 is preferably 0.5 mass % or less, more preferably 0.3 mass % or less, even more preferably 0.2 mass % or less, and particularly preferably 0.1 mass % or less. Such other refrigerants are not limited, and can be selected from a wide range of known refrigerants widely used in this field. Refrigerant 2 may comprise another refrigerant, or two or more other refrigerants.

Refrigerant 2 particularly preferably consists of HFO-1132(E), HFC-32, and HFO-1234yf. In other words, the total concentration of HFO-1132(E), HFC-32, and HFO-1234yf in the entire refrigerant 2 is particularly preferably 100 mass %.

When refrigerant 2 consists of HFO-1132(E), HFC-32, and HFO-1234yf, the three components have a mass ratio that falls within a region surrounded by a figure passing through the following 5 points in a ternary composition diagram whose three vertices represent the three components:

point P (HFO-1132(E)/HFC-32/HFO-1234yf=45.6/1.0/53.4 mass %),
point B (HFO-1132(E)/HFC-32/HFO-1234yf=35.3/1.0/63.7 mass %),
point Q (HFO-1132(E)/HFC-32/HFO-1234yf=1.0/24.8/74.2 mass %),
point R (HFO-1132(E)/HFC-32/HFO-1234yf=1.0/29.2/69.8 mass %), and
point S (HFO-1132(E)/HFC-32/HFO-1234yf=6.5/29.2/64.3 mass %).

The technical meanings of point P, point B, point Q, point R, and point S are as described above. The region surrounded by a figure passing through 5 points that are point P, point B, point Q, point R, and point S is as described above.

When the ternary mixed refrigerant of HFO-1132(E), HFC-32, and HFO-1234yf has a mass ratio within a region surrounded by lines connecting 5 points that are points P, B, Q, R, and S (PBQRS region), the GWP is 300 or less, the refrigerating capacity is 95% or more relative to that of R404A, and the pressure at 40° C. is 1.85 MPa.

Refrigerant 2, which has a GWP of 200 or less, can significantly reduce burden on the environment from a global warming perspective, as compared with other general-purpose refrigerants.

1.2 Application

In the present disclosure, refrigerant 1 and refrigerant 2 (or compositions containing these refrigerants) are suitable for use as alternative refrigerants for R12, R22, R134a, R404A, R407A, R4070, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R465A, R502, R507, or R513A. Among these refrigerants, refrigerant 1 and refrigerant 2 (or compositions containing these refrigerants) each have a refrigerating capacity equivalent to that of R404A, which is currently widely used, and have a sufficiently low GWP. Therefore, the refrigerants, which have these properties, are thus particularly suitable for use as alternative refrigerants for R404A.

The composition according to the present disclosure comprising such a refrigerant can be widely used as a working fluid for known refrigerant applications in, for example, 1) a refrigeration method comprising operating a refrigeration cycle or 2) a method for operating a refrigeration apparatus that operates a refrigeration cycle.

The refrigeration cycle herein means performing energy conversion by circulating the composition according to the present disclosure in the refrigeration apparatus through a compressor, the composition consisting of the above refrigerant (refrigerant 1 and refrigerant 2) or being in the form of a refrigerant composition or a refrigerant-oil-containing working fluid explained below.

Accordingly, the present disclosure includes an invention directed to use of the composition according to the present disclosure in a refrigeration method; an invention directed to use of the composition according to the present disclosure in a method for operating a refrigeration apparatus; and a refrigeration apparatus comprising the composition according to the present disclosure.

Preferable examples of refrigeration apparatuses in which the composition according to the present disclosure can be used include, but are not limited to, at least one member selected from the group consisting of air-conditioning systems, refrigerators, freezers, water coolers, ice makers, refrigerated showcases, freezing showcases, freezing and refrigerating units, refrigerating machines for freezing and refrigerating warehouses, air-conditioning systems for vehicles, turbo refrigerating machines, and screw refrigerating machines.

2. Refrigerant Composition

The refrigerant composition according to the present disclosure includes at least the refrigerant of the present disclosure, and can be used for the same applications as the refrigerant of the present disclosure.

Further, the refrigerant composition according to the present disclosure can be used to obtain a working fluid for a refrigeration apparatus by being mixed with at least a refrigerant oil.

The refrigerant composition according to the present disclosure further comprises at least one other component in addition to the refrigerant of the present disclosure. The refrigerant composition according to the present disclosure may optionally comprise at least one of the other components described below.

As described above, when the refrigerant composition according to the present disclosure is used as a working fluid for a refrigeration apparatus, it is usually mixed with at least a refrigerant oil, and used.

Preferably, the refrigerant composition according to the present disclosure is substantially free from refrigerant oil. Specifically, the refrigerant composition according to the present disclosure preferably has a refrigerant oil content of 0 to 1 mass %, more preferably 0 to 0.5 mass %, even more preferably 0 to 0.25 mass %, and particularly preferably 0 to 0.1 mass %, relative to the entire refrigerant composition.

2.1 Water

The refrigerant composition according to the present disclosure may comprise a small amount of water.

The water content of the refrigerant composition is preferably 0 to 0.1 mass %, more preferably 0 to 0.075 mass %, even more preferably 0 to 0.05 mass %, and particularly preferably 0 to 0.025 mass %, relative to the entire refrigerant.

A small amount of water contained in the refrigerant composition stabilizes double bonds in the molecules of unsaturated fluorocarbon-based compounds that can be present in the refrigerant; and makes it less likely that the unsaturated fluorocarbon-based compounds will be oxidized, thus increasing the stability of the refrigerant composition.

2.2 Tracer

A tracer is added to the refrigerant composition according to the present disclosure at a detectable concentration so that when the composition has been diluted, contaminated, or undergone some other changes, the tracer can trace the changes.

The refrigerant composition according to the present disclosure may comprise a single tracer, or two or more tracers.

The tracer is not limited, and can be suitably selected from commonly used tracers. Preferably, a compound that cannot become an impurity inevitably mixed into the refrigerant of the present disclosure can be selected as a tracer.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, nitrous oxides ($N_2O$), and the like. Of these, hydrofluorocarbons, hydrochlorofluorocarbons, chlorofluorocarbons, hydrochlorocarbons, fluorocarbons, and fluoroethers are preferred.

Specifically, the following compounds (hereinafter sometimes referred to as "tracer compounds") are more preferred as tracers. HCC-40 (chloromethane, $CH_3Cl$), HFC-41 (fluoromethane, $CH_3F$), HFC-161 (fluoroethane, $CH_3CH_2F$), HFC-245fa (1,1,1,3,3-pentafluoropropane, $CF_3CH_2CHF_2$), HFC-236fa (1,1,1,3,3,3-hexafluoropropane, $CF_3CH_2CF_3$), HFC-236ea (1,1,1,2,3,3-hexafluoropropane, $CF_3CHFCHF_2$), HCFC-22 (chlorodifluoromethane, $CHClF_2$), HCFC-31 (chlorofluoromethane, $CH_2ClF$), CFC-1113 (chlorotrifluoroethylene, $CF_2\!=\!CClF$), HFE-125 (trifluoromethyl-difluoromethyl ether, $CF_3OCHF_2$), HFE-134a (trifluoromethyl-fluoromethyl ether, $CF_3OCH_2F$), HFE-143a (trifluoromethyl-methyl ether, $CF_3OCH_3$), HFE-227ea (trifluoromethyl-tetrafluoroethyl ether, $CF_3OCHFCF_3$), and HFE-236fa (trifluoromethyl-trifluoroethyl ether, $CF_3OCH_2CF_3$).

The tracer compound can be present in the refrigerant composition in a total concentration of 10 parts per million by mass (ppm) to 1000 ppm. The tracer compound is preferably present in the refrigerant composition in a total concentration of 30 ppm to 500 ppm, more preferably 50 ppm to 300 ppm, even more preferably 75 ppm to 250 ppm, and particularly preferably 100 ppm to 200 ppm.

2.3 Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. Of these, naphthalimide and coumarin are preferred.

2.4 Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane and the like.

Examples of amines include 2,2,3,3,3-pentafluoropropylamine, diphenyl amine, and the like.

Examples of stabilizers also include butylhydroxyxylene, benzotriazole, and the like, in addition to nitro compounds, ethers, and amines.

The amount of the stabilizer is not limited. The amount of the stabilizer is usually 0.01 to 5 mass %, preferably 0.05 to 3 mass %, more preferably 0.1 to 2 mass %, even more preferably 0.25 to 1.5 mass %, and particularly preferably 0.5 to 1 mass %, relative to the entire refrigerant.

The stability of the refrigerant composition according to the present disclosure can be evaluated by a commonly used method, without limitation. Examples of such methods include an evaluation method using the amount of free fluorine ions as an index according to ASHRAE Standard 97-2007. Other examples include an evaluation method using the total acid number as an index. This method can be performed, for example, according to ASTM D 974-06.

2.5 Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, benzotriazole, and the like.

The amount of the polymerization inhibitor is not limited. The amount of the polymerization inhibitor is usually 0.01 to 5 mass %, preferably 0.05 to 3 mass %, more preferably 0.1 to 2 mass %, even more preferably 0.25 to 1.5 mass %, and particularly preferably 0.5 to 1 mass %, relative to the entire refrigerant.

2.6 Other Components that can be Contained in Refrigerant Composition

The refrigerant composition according to the present disclosure can also contain the following components.

For example, the refrigerant composition can contain fluorinated hydrocarbons that are different from the refrigerants mentioned above. Examples of fluorinated hydrocarbons that can be used as other components include, but are not limited to, at least one fluorinated hydrocarbon selected from the group consisting of HCFC-1122, HCFC-124, and CFC-1113.

The refrigerant composition can contain, as other components, at least one halogenated organic compound represented by formula (A): $C_mH_nX^1_p$ (wherein each $X^1$ is independently fluorine, chlorine, or bromine; m is 1 or 2;

2m+2≥n+p; and p≥1. Preferable examples of halogenated organic compounds include, but are not limited to, difluorochloromethane, chloromethane, 2-chloro-1,1,1,2,2-pentafluoroethane, 2-chloro-1,1,1,2-tetrafluoroethane, 2-chloro-1,1-difluoroethylene, trifluoroethylene, and the like.

The refrigerant composition can contain, as other components, at least one organic compound represented by formula (B): $C_mH_nX^2_p$ (wherein each $X^2$ is independently an atom other than a halogen atom; m is 1 or 2; 2m+2≥n+p; and p≥1. Preferable examples of organic compounds include, but are not limited to, propane, isobutene, and the like.

The amounts of the fluorinated hydrocarbon, halogenated organic compound represented by formula (A), and organic compound represented by formula (B) are not limited. The total amount of these is preferably 0.5 mass % or less, more preferably 0.3 mass % or less, and particularly preferably 0.1 mass % or less, relative to the total amount of the refrigerant composition.

3. Refrigerant-Oil-Containing Working Fluid

The refrigerant-oil-containing working fluid according to the present disclosure includes at least the refrigerant or the refrigerant composition according to the present disclosure, and a refrigerant oil; and is used as a working fluid in a refrigeration apparatus. Specifically, the refrigerant-oil-containing working fluid according to the present disclosure can be obtained by mixing together the refrigerant or refrigerant composition with a refrigerant oil used in a compressor of a refrigeration apparatus.

The amount of the refrigerant oil is not limited, and is usually 10 to 50 mass %, preferably 12.5 to 45 mass %, more preferably 15 to 40 mass %, even more preferably 17.5 to 35 mass %, and particularly preferably 20 to 30 mass %, relative to the entire refrigerant-oil-containing working fluid.

3.1 Refrigerant Oil

The composition according to the present disclosure may comprise a single refrigerant oil, or two or more refrigerant oils.

The refrigerant oil is not limited, and can be suitably selected from commonly used refrigerant oils. In this case, refrigerant oils that are more excellent, for example, in the acting of enhancing the miscibility with the mixture of refrigerants according to the present disclosure (mixed refrigerant of the present disclosure) and stability of the mixed refrigerant can be suitably selected as necessary.

The base oil of the refrigerant oil is preferably, for example, at least one member selected from the group consisting of polyalkylene glycols (PAG), polyol esters (POE), and polyvinyl ethers (PVE).

The refrigerant oil can further contain an additive in addition to the base oil.

The additive may be at least one member selected from the group consisting of antioxidants, extreme-pressure agents, acid scavengers, oxygen scavengers, copper deactivators, anticorrosive agents, oily agents, and antifoaming agents.

A refrigerant oil with a kinematic viscosity of 5 to 400 cSt at 40° C. is preferable from the standpoint of lubrication.

The refrigerant-oil-containing working fluid according to the present disclosure may further optionally comprise at least one additive. Examples of additives include the compatibilizing agents described below.

3.2 Compatibilizing Agent

The refrigerant-oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkane. Of these, a polyoxyalkylene glycol ether is preferred.

EXAMPLES

More specific explanations are given below with reference to Examples. However, the present disclosure is not limited to the following Examples.

Test Example 1

The GWP of the mixed refrigerants shown in Examples 1-1 to 1-11, Comparative Examples 1-1 to 1-6, and Reference Example 1-1 (R404A) was evaluated based on the values in the fourth report of the Intergovernmental Panel on Climate Change (IPCC).

The COP, refrigerating capacity, and saturation pressure at 40° C. of the mixed refrigerants were determined by performing refrigeration cycle theoretical calculations for the mixed refrigerants by using the Reference Fluid Thermodynamic and Transport Properties Database (Refprop 10.0) of the National Institute of Science and Technology (NIST) under the following conditions.

Evaporation temperature: −40° C.
Condensation temperature: 40° C.
Superheating temperature: 20 K
Supercooling temperature: 0 K
Compressor efficiency: 70%

Table 5 and Table 6 show the results of Test Example 1. Tables 5 and 6 show Examples of refrigerant 1 according to the present disclosure, and Comparative Examples. In Tables 5 and 6, the "COP ratio (relative to R404A)" and the "refrigerating capacity ratio (relative to R404A)" refer to a ratio (%) relative to R404A. In Tables 5 and 6, the "saturation pressure (40° C.)" refers to a saturation pressure at a saturation temperature of 40° C.

The coefficient of performance (COP) was calculated according to the following equation.

$$COP = \text{(refrigerating capacity or heating capacity)} / \text{amount of electrical power consumed}$$

The flammability of the mixed refrigerants was determined by adjusting the formulations of the mixed refrigerants to WCF concentrations, and measuring the burning velocity according to ANSI/ASHRAE Standard 34-2013.

The burning velocity test was performed as follows. First, a mixed refrigerant having a purity of 99.5% or more was used, and the mixed refrigerant was deaerated by repeating a cycle of freezing, pumping, and thawing until no trace of air was observed on the vacuum gauge. The burning velocity was measured by a closed method. The initial temperature was the ambient temperature. The ignition was performed by generating an electrical spark between the electrodes in the center of the sample cell. The duration of the discharge was 1.0 to 9.9 ms, and the ignition energy was typically about 0.1 to 1.0 J. The spread of the flame was visualized by using Schlieren photographs. A cylindrical container (inner diameter: 155 mm, length: 198 mm) having two acrylic windows that transmit light was used as a sample cell, and a xenon lamp was used as a light source. Schlieren images of the flame were recorded using a high-speed digital video camera at a frame speed of 600 fps, and stored in a PC. When the burning velocity could not be measured (0 cm/s), it was evaluated as "None (non-flammable)."

Figure 3:
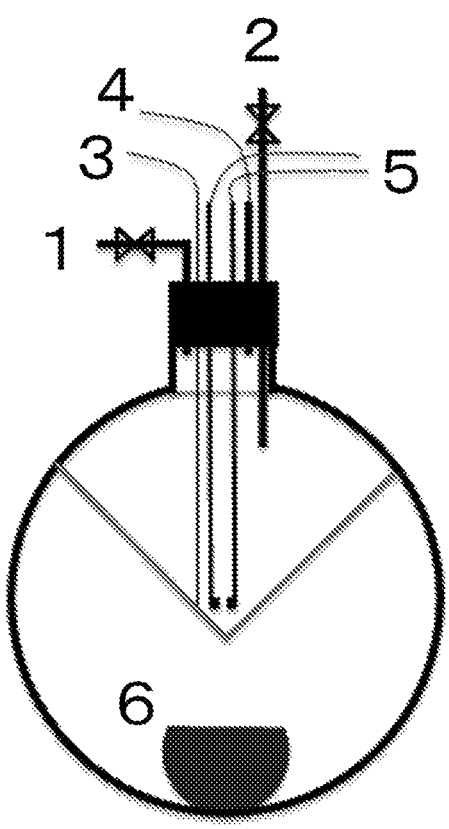
FIG. 3 is a schematic diagram illustrating an experimental apparatus for examining flammability (flammable or non-flammable).

The flammable range of the mixed refrigerant was measured using a measurement device according to ASTM E681-09 (see FIG. 3). More specifically, a 12-L spherical glass flask was used so that the combustion state could be visually observed and photographically recorded. When excessive pressure was generated by combustion in the glass flask, gas was allowed to escape from the upper lid. Ignition was achieved by electric discharge from electrodes disposed at one-third the distance from the bottom.

Test Conditions
Test vessel: 280-mm φ spherical (internal volume: 12 liters)
Test temperature: 60° C.±3° C.
Pressure: 101.3 kPa±0.7 kPa
Water: 0.0088 g±0.0005 g (water content at a relative humidity of 50% at 23° C.) per gram of dry air
Mixing ratio of refrigerant composition/air: 1 vol. % increments±0.2 vol. %
Mixture of refrigerant composition: ±0.1 mass %
Ignition method: AC discharge, voltage: 15 kV, electric current: 30 mA, neon transformer
Electrode spacing: 6.4 mm (¼ inch)
Spark: 0.4 seconds±0.05 seconds
Evaluation Criteria:
When the flame spread at an angle of more than 90° from the ignition point, it was evaluated that flame propagation was present (flammable).
When the flame spread at an angle of 90° or less from the ignition point, it was evaluated that flame propagation was absent (non-flammable).

TABLE 5

| Item | | Unit | Reference Example 1-1 (R404A) | Comp. Example 1-1 | Comp. Example 1-2 | Comp. Example 1-3 | Comp. Example 1-4 | Comp. Example 1-5 |
|---|---|---|---|---|---|---|---|---|
| Composition ratio | HFO-1132(E) | mass % | 0% | 40.0% | 30.0% | 20.0% | 10.0% | 10.0% |
| | HFC-32 | mass % | 0% | 10.0% | 20.0% | 10.0% | 10.0% | 30.0% |
| | HFO-1234yf | mass % | 0% | 50.0% | 50.0% | 70.0% | 80.0% | 60.0% |
| | HFC-125 | mass % | 44.0% | 0% | 0% | 0% | 0% | 0% |
| | HFC-143a | mass % | 52.0% | 0% | 0% | 0% | 0% | 0% |
| | HFC-134a | mass % | 4.0% | 0% | 0% | 0% | 0% | 0% |
| GWP | | — | 3922 | 74 | 140 | 72 | 72 | 206 |
| COP ratio (relative to R404A) | | % | 100 | 105.2 | 105.8 | 106.1 | 106.6 | 107.5 |
| Refrigerating capacity ratio (relative to 404A) | | % | 100 | 116.0 | 121.4 | 93.3 | 81.3 | 113.9 |
| Saturation pressure (40° C.) | | MPa | 1.822 | 1.982 | 2.044 | 1.684 | 1.513 | 1.922 |
| Burning velocity | | cm/s | None (non-flammable) | 5.7 | 5.8 | 2.8 | 2.2 | 3.8 |

| Item | | Comp. Example 1-6 | Example 1-1 | Example 1-2 | Example 1-3 | Example 1-4 | Example 1-5 |
|---|---|---|---|---|---|---|---|
| Composition ratio | HFO-1132(E) | 14.0% | 43.0% | 35.0% | 30.0% | 24.0% | 20.0% |
| | HFC-32 | 21.0% | 2.0% | 7.0% | 10.0% | 14.0% | 15.0% |
| | HFO-1234yf | 65.0% | 55.0% | 58.0% | 60.0% | 62.0% | 65.0% |
| | HFC-125 | 0% | 0% | 0% | 0% | 0% | 0% |
| | HFC-143a | 0% | 0% | 0% | 0% | 0% | 0% |
| | HFC-134a | 0% | 0% | 0% | 0% | 0% | 0% |
| GWP | | 146 | 20 | 53 | 73 | 100 | 106 |
| COP ratio (relative to R404A) | | 106.8 | 105.1 | 105.4 | 105.6 | 106.0 | 106.3 |
| Refrigerating capacity ratio (relative to 404A) | | 104.6 | 105.3 | 105.3 | 104.8 | 104.8 | 101.8 |
| Saturation pressure (40° C.) | | 1.821 | 1.839 | 1.845 | 1.839 | 1.836 | 1.795 |
| Burning velocity | | 3.5 | 4.1 | 4.0 | 3.9 | 4.1 | 3.5 |

TABLE 6

| Item | | Unit | Reference Example 1-1 (R404A) | Example 1-6 A | Example 1-7 B | Example 1-8 C | Example 1-9 D | Example 1-10 E | Example 1-11 F |
|---|---|---|---|---|---|---|---|---|---|
| Composition ratio | HFO-1132(E) | mass % | 0% | 51.8% | 35.3% | 10.1% | 27.8% | 15.2% | 31.1% |
| | HFC-32 | mass % | 0% | 1.0% | 1.0% | 18.0% | 18.0% | 14.3% | 14.3% |
| | HFO-1234yf | mass % | 0% | 47.2% | 63.7% | 71.9% | 54.2% | 70.5% | 54.6% |
| | HFC-125 | mass % | 44.0% | 0% | 0% | 0% | 0% | 0% | 0% |
| | HFC-143a | mass % | 52.0% | 0% | 0% | 0% | 0% | 0% | 0% |
| | HFC-134a | mass % | 4.0% | 0% | 0% | 0% | 0% | 0% | 0% |
| GWP | | — | 3922 | 14 | 13 | 125 | 125 | 100 | 100 |
| COP ratio (relative to R404A) | | % | 100 | 105.0 | 105.3 | 107.0 | 105.9 | 106.5 | 105.7 |
| Refrigerating capacity ratio (relative to 404A) | | % | 100 | 113.0 | 95.0 | 95.0 | 115.7 | 95.0 | 113.4 |
| Saturation pressure (40° C.) | | MPa | 1.822 | 1.933 | 1.701 | 1.696 | 1.974 | 1.702 | 1.948 |
| Burning velocity | | cm/s | None (non-flammable) | 5.0 | 2.5 | 3.0 | 5.0 | 3.0 | 5.0 |

Test Example 2

The GWP of the mixed refrigerants shown in Examples 2-1 to 2-11, Comparative Examples 2-1 to 2-5, and Reference Example 2-1 (R404A) was evaluated based on the values shown in the fourth report of the IPCC.

The COP, refrigerating capacity, discharge temperature, and saturation pressure at a saturation temperature of 40° C. of the mixed refrigerants were determined by performing refrigeration cycle theoretical calculations for the mixed refrigerants by using the Reference Fluid Thermodynamic and Transport Properties Database (Refprop 10.0) of the National Institute of Science and Technology (NIST) under the following conditions.
Evaporation temperature: −40° C.
Condensation temperature: 40° C.
Superheating temperature: 20 K
Supercooling temperature: 0 K
Compressor efficiency: 70%

Tables 7 and 8 show the results of Test Example 2. Tables 7 and 8 show Examples of refrigerant 2 according to the present disclosure, and Comparative Examples. In Tables 7 and 8, the meaning of each term is the same as that of Test Example 1.

The coefficient of performance (COP) was calculated according to the following equation.

COP=(Refrigerating capacity or heating capacity)/ Amount of electrical power consumed The flammability of the mixed refrigerant was evaluated as in Test Example 1. The burning velocity test was performed as in Test Example 1.

The flammable range of the mixed refrigerant was measured in the same manner and under the same test conditions as in Test Example 1, by using a measurement device according to ASTM E681-09 (see FIG. 3).

TABLE 7

| Item | | Unit | Reference Example 2-1 (R404A) | Comp. Ex. 2-1 | Comp. Ex. 2-2 | Comp. Ex. 2-3 | Comp. Ex. 2-4 | Comp. Ex. 2-5 | Example 2-1 | Example 2-2 | Example 2-3 | Example 2-4 | Example 2-5 | Example 2-6 |
|---|---|---|---|---|---|---|---|---|---|---|---|---|---|---|
| Composition ratio | HFO-1132(E) | mass % | 0% | 40.0% | 30.0% | 20.0% | 10.0% | 10.0% | 43.0% | 35.0% | 30.0% | 24.0% | 14.0% | 20.0% |
| | HFC-32 | mass % | 0% | 10.0% | 20.0% | 10.0% | 10.0% | 30.0% | 2.0% | 7.0% | 10.0% | 14.0% | 21.0% | 15.0% |
| | HFO-1234yf | mass % | 0% | 50.0% | 50.0% | 70.0% | 80.0% | 60.0% | 55.0% | 58.0% | 60.0% | 62.0% | 65.0% | 65.0% |
| | HFC-125 | mass % | 44.0% | 0% | 0% | 0% | 0% | 0% | 0% | 0% | 0% | 0% | 0% | 0% |
| | HFC-143a | mass % | 52.0% | 0% | 0% | 0% | 0% | 0% | 0% | 0% | 0% | 0% | 0% | 0% |
| | HFC-134a | mass % | 4.0% | 0% | 0% | 0% | 0% | 0% | 0% | 0% | 0% | 0% | 0% | 0% |
| GWP | | — | 3922 | 74 | 140 | 72 | 72 | 206 | 20 | 53 | 73 | 100 | 146 | 106 |
| COP ratio (relative to R404A) | | % | 100 | 105.2 | 105.8 | 106.1 | 106.6 | 107.5 | 105.1 | 105.4 | 105.6 | 106.0 | 106.8 | 106.3 |
| refrigerating capacity ratio (relative to R404A) | | % | 100 | 116.0 | 121.4 | 93.3 | 81.3 | 113.9 | 105.3 | 105.3 | 104.8 | 104.8 | 104.6 | 101.8 |
| Saturation pressure (40° C.) | | MPa | 1.822 | 1.982 | 2.044 | 1.684 | 1.513 | 1.922 | 1.839 | 1.845 | 1.839 | 1.836 | 1.821 | 1.795 |
| Burning velocity | | cm/s | None (non-flammable) | 5.7 | 5.8 | 2.8 | 2.2 | 3.8 | 4.1 | 4.0 | 3.9 | 4.1 | 3.5 | 3.5 |

TABLE 8

| Item | | Unit | Reference Example 2-1 (R404A) | Example 2-7 P | Example 2-8 B | Example 2-9 Q | Example 2-10 R | Example 2-11 S |
|---|---|---|---|---|---|---|---|---|
| Composition ratio | HFO-1132(E) | mass % | 0% | 45.6% | 35.3% | 1.0% | 1.0% | 6.5% |
| | HFC-32 | mass % | 0% | 1.0% | 1.0% | 24.8% | 29.2% | 29.2% |
| | HFO-1234yf | mass % | 0% | 53.4% | 63.7% | 74.2% | 69.8% | 64.3% |
| | HFC-125 | mass % | 44.0% | 0% | 0% | 0% | 0% | 0% |
| | HFC-143a | mass % | 52.0% | 0% | 0% | 0% | 0% | 0% |
| | HFC-134a | mass % | 4.0% | 0% | 0% | 0% | 0% | 0% |
| GWP | | — | 3922 | 14 | 13 | 170 | 200 | 200 |
| COP ratio (relative to R404A) | | % | 100 | 105.1 | 105.3 | 108.0 | 108.2 | 107.7 |
| Refrigerating capacity ratio (relative to R404A) | | % | 100 | 106.4 | 95.0 | 95.0 | 101.8 | 108.5 |
| Saturation pressure (40° C.) | | MPa | 1.822 | 1.850 | 1.701 | 1.674 | 1.757 | 1.850 |
| Burning velocity | | cm/s | None (non-flammable) | 4.3 | 2.5 | 2.7 | 2.9 | 3.4 |

The present disclosure provides the invention according to the following embodiments.

Item 1. A composition comprising a refrigerant, the refrigerant comprising trans-1,2-difluoroethylene (HFO-1132 (E)), difluoromethane (HFC-32), and 2,3,3,3-tetrafluoropropene (HFO-1234yf),
wherein the total concentration of the three components is 99.5 mass % or more, based on the entire refrigerant, and the three components have a mass ratio that falls within a region surrounded by a figure passing through the following 4 points in a ternary composition diagram whose three vertices represent the three components:
point A (HFO-1132(E)/HFC-32/HFO-1234yf=51.8/1.0/47.2 mass %),
point B (HFO-1132(E)/HFC-32/HFO-1234yf=35.3/1.0/63.7 mass %),
point C (HFO-1132(E)/HFC-32/HFO-1234yf=10.1/18.0/71.9 mass %), and
point D (HFO-1132(E)/HFC-32/HFO-1234yf=27.8/18.0/54.2 mass %).

Item 2. The composition comprising a refrigerant according to Item 1, wherein the refrigerant comprises HFO-1132 (E), HFC-32, and HFO-1234yf, the total concentration of the three components is 99.5 mass % or more, based on the entire refrigerant, and the three components have a mass ratio that falls within a region surrounded by a figure passing through the following 4 points in a ternary composition diagram whose three vertices represent the three components:
point A (HFO-1132(E)/HFC-32/HFO-1234yf=51.8/1.0/47.2 mass %),
point B (HFO-1132(E)/HFC-32/HFO-1234yf=35.3/1.0/63.7 mass %),
point E (HFO-1132(E)/HFC-32/HFO-1234yf=15.2/14.3/70.5 mass %), and
point F (HFO-1132(E)/HFC-32/HFO-1234yf=31.1/14.3/54.6 mass %).

Item 3. The composition according to Item 1 or 2, wherein the refrigerant consists of HFO-1132(E), HFC-32, and HFO-1234yf.

Item 4. A composition comprising a refrigerant, the refrigerant comprising trans-1,2-difluoroethylene (HFO-1132 (E)), difluoromethane (HFC-32), and 2,3,3,3-tetrafluoropropene (HFO-1234yf),
wherein the total concentration of the three components is 99.5 mass % or more, based on the entire refrigerant, and the three components have a mass ratio that falls within a region surrounded by a figure passing through the following 5 points in a ternary composition diagram whose three vertices represent the three components:
point P (HFO-1132(E)/HFC-32/HFO-1234yf=45.6/1.0/53.4 mass %),
point B (HFO-1132(E)/HFC-32/HFO-1234yf=35.3/1.0/63.7 mass %),
point Q (HFO-1132(E)/HFC-32/HFO-1234yf=1.0/24.8/74.2 mass %),
point R (HFO-1132(E)/HFC-32/HFO-1234yf=1.0/29.2/69.8 mass %), and
point S (HFO-1132(E)/HFC-32/HFO-1234yf=6.5/29.2/64.3 mass %).

Item 5. The composition according to Item 4, wherein the refrigerant consists of HFO-1132(E), HFC-32, and HFO-1234yf.

Item 6. The composition according to any one of Items 1 to 5, comprising at least one substance selected from the group consisting of water, tracers, ultraviolet fluorescent dyes, stabilizers, and polymerization inhibitors.

Item 7. The composition according to any one of Items 1 to 6, wherein the composition further comprises a refrigerant oil and is for use as a working fluid for a refrigeration apparatus.

Item 8. The composition according to Item 7, wherein the refrigerant oil comprises at least one polymer selected from the group consisting of polyalkylene glycol (PAG), polyol ester (POE), and polyvinyl ether (PVE).

Item 9. The composition according to any one of Items 1 to 8, which is for use as a refrigerant.

Item 10. The composition according to Item 9, which is for use as a refrigerant in a refrigeration apparatus.

Item 11. The composition according to Item 10, wherein the refrigeration apparatus is at least one member selected from the group consisting of air-conditioning systems, refrigerators, freezers, water coolers, ice makers, refrigerated showcases, freezing showcases, freezing and refrigerating units, refrigerating machines for freezing and refrigerating warehouses, air-conditioning systems for vehicles, turbo refrigerating machines, and screw refrigerating machines.

Item 12. The composition according to any one of Items 9 to 11, wherein the refrigerant has the mass ratio of any one of Items 1 to 5 and is for use as an alternative refrigerant for R12, R22, R134a, R404A, R407A, R4070, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R465A, R502, R507, or R513A.

Item 13. Use of the composition of any one of Items 1 to 8 as a refrigerant.

Item 14. The use according to Item 13 in a refrigeration apparatus.

Item 15. The use according to Item 14, wherein the refrigeration apparatus is at least one member selected from the group consisting of air-conditioning systems, refrigerators, freezers, water coolers, ice makers, refrigerated showcases, freezing showcases, freezing and refrigerating units, refrigerating machines for freezing and refrigerating warehouses, air-conditioning systems for vehicles, turbo refrigerating machines, and screw refrigerating machines.

Item 16. The use according to any one of Items 13 to 15, wherein the refrigerant has the mass ratio of any one of Items 1 to 5 and is for use as an alternative refrigerant for R12, R22, R134a, R404A, R407A, R4070, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R465A, R502, R507, or R513A.

Item 17. A refrigeration method comprising operating a refrigeration cycle using the composition of any one of Items 1 to 8.

Item 18. A method for operating a refrigeration apparatus comprising the composition of any one of Items 1 to 8.

Item 19. A refrigeration apparatus comprising the composition of any one of Items 1 to 8 as a working fluid.

Item 20. The refrigeration apparatus according to Item 19, which is at least one member selected from the group consisting of air-conditioning systems, refrigerators, freezers, water coolers, ice makers, refrigerated showcases, freezing showcases, freezing and refrigerating units, refrigerating machines for freezing and refrigerating warehouses, air-conditioning systems for vehicles, turbo refrigerating machines, and screw refrigerating machines.

DESCRIPTION OF THE REFERENCE NUMERALS

1: Feeding Line
2: Sampling Line
3: Thermometer
4: Pressure gauge
5: Electrode
6: Stirring blades (made of PTFE)
A: the mass ratio at which the burning velocity as measured according to ANSI/ASHRAE Standard 34-2013 is 5.0 cm/s and the concentration (mass %) of HFC-32 is 1.0 mass %.
B: the mass ratio at which the concentration (mass %) of HFC-32 is 1.0 mass % and the refrigerating capacity is 95% relative to that of R404A.
C: the mass ratio at which the refrigeration capacity is 95% relative to that of R404A, and the GWP is 125.
D: the mass ratio at which the GWP is 125 and the burning velocity as measured according to ANSI/ASHRAE Standard 34-2013 is 5.0 cm/s.
E: the mass ratio at which the refrigeration capacity is 95% relative to that of R404A, and the GWP is 100.
F: the mass ratio at which the GWP is 100 and the burning velocity as measured according to ANSI/ASHRAE Standard 34-2013 is 5.0 cm/s.
a: a straight line representing the mass ratio at which the concentration (mass %) of HFC-32 is 1.0 mass %.
b: a curve representing the mass ratio at which the refrigerating capacity is 95% relative to that of R404A.
c: a straight line representing the mass ratio at which the GWP is 125.
d: a curve representing the mass ratio at which the burning velocity as measured according to ANSI/ASHRAE Standard 34-2013 is 5.0 cm/s.
e: a straight line representing the mass ratio at which the GWP is 100;
f: a straight line indicating the mass ratio at which the GWP is 200;
P: the mass ratio at which the pressure at 40° C. is 1.85 MPa and the concentration (mass %) of HFC-32 is 1.0 mass %.
B: the mass ratio at which the concentration (mass %) of HFC-32 is 1.0 mass % and the refrigerating capacity is 95% relative to that of R404A.
Q: the mass ratio at which the refrigerating capacity is 95% relative to that of R404A and the concentration (mass %) of HFO-1132(E) is 1.0 mass %.
R: the mass ratio at which the concentration (mass %) of HFO-1132(E) is 1.0 mass % and the GWP is 200.
S: the mass ratio at which the GWP is 200 and the pressure at 40° C. is 1.85 MPa.
p: a straight line representing the mass ratio at which the concentration (mass %) of HFC-32 is 1.0 mass %.
q: a curve representing the mass ratio at which the refrigerating capacity is 95% relative to that of R404A.
r: a straight line representing the mass ratio at which the concentration (mass %) of HFO-1132(E) is 1.0 mass %.
s: a straight line representing the mass ratio at which the GWP is 200.
t: a curve representing the mass ratio at which the pressure at 40° C. is 1.85 MPa.
u: a straight line representing the mass ratio at which the GWP is 100.

The invention claimed is:

1. A composition comprising a refrigerant, the refrigerant comprising trans-1,2-difluoroethylene (HFO-1132(E)), difluoromethane (HFC-32), and 2,3,3,3-tetrafluoropropene (HFO-1234yf),
wherein the total concentration of the three components is 99.5 mass % or more, based on the entire refrigerant, and the three components have a mass ratio that falls within a region surrounded by a figure passing through the following 4 points in a ternary composition diagram whose three vertices represent the three components:
point A (HFO-1132(E)/HFC-32/HFO-1234yf=51.8/1.0/47.2 mass %),
point B (HFO-1132(E)/HFC-32/HFO-1234yf=35.3/1.0/63.7 mass %),
point C (HFO-1132(E)/HFC-32/HFO-1234yf=10.1/18.0/71.9 mass %), and
point D (HFO-1132(E)/HFC-32/HFO-1234yf=27.8/18.0/54.2 mass %).

2. The composition comprising a refrigerant according to claim 1, wherein the refrigerant comprises HFO-1132(E), HFC-32, and HFO-1234yf, the total concentration of the three components is 99.5 mass % or more, based on the entire refrigerant, and the three components have a mass ratio that falls within a region surrounded by a figure passing through the following 4 points in a ternary composition diagram whose three vertices represent the three components:

point A (HFO-1132(E)/HFC-32/HFO-1234yf=51.8/1.0/47.2 mass %),
point B (HFO-1132(E)/HFC-32/HFO-1234yf=35.3/1.0/63.7 mass %),
point E (HFO-1132(E)/HFC-32/HFO-1234yf=15.2/14.3/70.5 mass %), and
point F (HFO-1132(E)/HFC-32/HFO-1234yf=31.1/14.3/54.6 mass %).

3. A composition comprising a refrigerant, the refrigerant comprising trans-1,2-difluoroethylene (HFO-1132(E)), difluoromethane (HFC-32), and 2,3,3,3-tetrafluoropropene (HFO-1234yf),
wherein the total concentration of the three components is 99.5 mass % or more, based on the entire refrigerant, and the three components have a mass ratio that falls within a region surrounded by a figure passing through the following 5 points in a ternary composition diagram whose three vertices represent the three components:
point P (HFO-1132(E)/HFC-32/HFO-1234yf=45.6/1.0/53.4 mass %),
point B (HFO-1132(E)/HFC-32/HFO-1234yf=35.3/1.0/63.7 mass %),
point Q (HFO-1132(E)/HFC-32/HFO-1234yf=1.0/24.8/74.2 mass %),
point R (HFO-1132(E)/HFC-32/HFO-1234yf=1.0/29.2/69.8 mass %), and
point S (HFO-1132(E)/HFC-32/HFO-1234yf=6.5/29.2/64.3 mass %).

4. The composition according to claim 1, wherein the refrigerant consists of HFO-1132(E), HFC-32, and HFO-1234yf.

5. The composition according to claim 1, which is for use as an alternative refrigerant for R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R465A, R502, R507, or R513A.

6. The composition according to claim 1, comprising at least one substance selected from the group consisting of water, tracers, ultraviolet fluorescent dyes, stabilizers, and polymerization inhibitors.

7. The composition according to claim 1, wherein the composition further comprises a refrigerant oil and is for use as a working fluid for a refrigeration apparatus.

8. The composition according to claim 7, wherein the refrigerant oil comprises at least one polymer selected from the group consisting of polyalkylene glycol (PAG), polyol ester (POE), and polyvinyl ether (PVE).

9. A refrigeration method comprising operating a refrigeration cycle using the composition of claim 1.

10. A method for operating a refrigeration apparatus that operates a refrigeration cycle using the composition of claim 1.

11. A refrigeration apparatus comprising the composition of claim 1 as a working fluid.

12. The refrigeration apparatus according to claim 11, which is at least one member selected from the group consisting of air-conditioning systems, refrigerators, freezers, water coolers, ice makers, refrigerated showcases, freezing showcases, freezing and refrigerating units, refrigerating machines for freezing and refrigerating warehouses, air-conditioning systems for vehicles, turbo refrigerating machines, and screw refrigerating machines.

* * * * *